Dec. 13, 1927.
J. T. SCULLY
ARM REST
Filed March 31, 1926
1,652,801
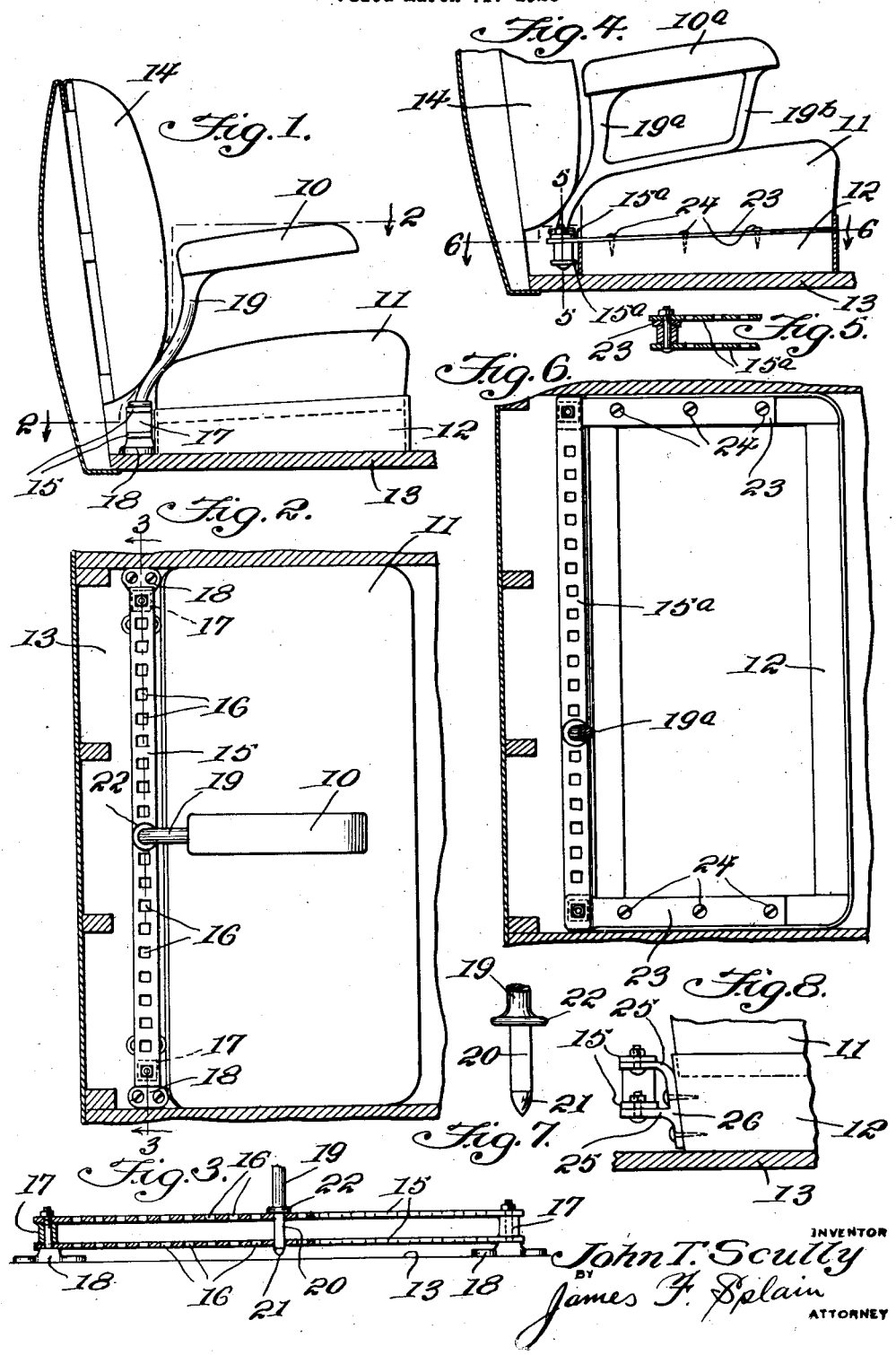
INVENTOR
John T. Scully
BY
James F. Splain
ATTORNEY Patented Dec. 13, 1927.

1,652,801

UNITED STATES PATENT OFFICE.

JOHN T. SCULLY, OF NEW YORK, N. Y.

ARM REST.

Application filed March 31, 1926. Serial No. 98,722.

This invention relates to improvements in seats and has especial reference to arm rests, and is a companion to a co-pending application filed of even date.

Like the application referred to, the invention disclosed in the present application is especially adapted for use in automobiles or other vehicles, but is capable of use with seats of various kinds.

The principal objects of the invention are to provide a rest which may be removably positioned and adjusted longitudinally of the seat to accommodate the user, and which is supported without interfering with or restricting the floor space of the vehicle, or forming inconvenient obstructions, the rest being further supported without pressure upon the seat cushion.

A further object of this invention is to provide means whereby one or more arm rests can be held in removable engagement with said means.

A still further object of this invention is to provide means for engagement with an arm rest to hold the rest in position and to place such means in a more or less particular location relative to a seat.

With the above and other objects in view, the invention further includes the following novel features and details of construction, to be hereinafter more fully described, illustrated in the accompanying drawings and pointed out in the appended claim.

In the drawings:—

Figure 1 is an elevation partly in section illustrating the use of the invention.

Figure 2 is a section taken substantially on the line 2—2 of Figure 1.

Figure 3 is a section taken substantially on the line 3—3 of Figure 2.

Figure 4 is a view similar to Figure 1 but showing a slightly different form of the invention.

Figure 5 is a section on the line 5—5 of Figure 4.

Figure 6 is a section on the line 6—6 of Figure 4.

Figure 7 is an enlarged fragmentary elevation of the lower end of the arm rest standard.

Figure 8 is a fragmentary end view of another form of the invention.

It will be seen from the drawings that I have provided means whereby not only one but several or more arm rests can be positioned relative to a seat, and that this arrangement has particular utility in seats of various kinds; for example, when employed in connection with the usual automobile seat the invention provides a highly satisfactory means for converting the seat into individual sections so that an occupant, alone on the seat, may enjoy the arm rest or rests; and, or in the case of two occupants on the seat, each may enjoy an arm rest for either or both arms; also, the invention has practical utility in automobile seats in that where occasion arises to "crowd" the seat, the arm rests can be easily removed.

While I have herein shown this invention as applied to an automobile or other vehicle seat, I do not wish to be limited thereto in its application. Likewise, I desire not to be restricted to any particular shape or size or line of contour of the arm rest or the standard carrying the rest. The standard may be round or flat or relatively flat or tapering. Also, while I herein show a pair of spaced bars provided with spaced aligned openings and extending longitudinally along the rear of a seat or seat frame, I desire it to be understood that this construction is for purposes of illustration, and that other forms and other constructions may be used; for example, I may employ a single bar or portions or sections of a single or of a pair of bars; or I may provide an extended seat frame with means incorporated therein or attached thereto to receive at the rear of a seat cushion the extended end of an arm rest. The fundamental feature is that at the rear of a seat I provide means to engage an arm rest, and associated with means at the rear of a seat are means permitting adjustable positioning of an arm rest.

Referring to the drawings in detail, there is illustrated in Figures 1, 2 and 3 of the invention an arm rest 10 which is supported in spaced relation above a seat cushion 11. The seat illustrated is the usual automobile seat and the cushion 11 is mounted upon a seat frame 12 which is supported by the floor boards 13, while the reference character 14 indicates the back cushion of the seat.

Extending longitudinally along the rear of the seat frame 12 is a pair of spaced bars 15 which are provided with spaced aligned openings 16. These bars are spaced apart by spacing elements 17 and are secured upon supports 18 anchored to the floor 13.

The arm rest 10 is carried by a standard 19 whose lower end is provided with a transversely rectangular portion 20 and whose lower end 21 is tapered or pointed. At the upper end of the rectangular portion 21 there is provided a shoulder 22.

By reference to Figures 1 and 2 of the drawings it will be seen that the rectangular portion 20 may be inserted in any of the openings 16 and the arm rest 10 positioned transversely of the seat cushion for use. The position of the rest may be regulated with respect to the length of the seat and in accordance with the wishes of the occupant of the seat.

In Figures 4, 5 and 6, the bars 15$^a$ have attached thereto anchoring arms 23 which are disposed at right angles with respect to the bars and which may be secured to the seat frame 12 by suitable fastening devices indicated at 24. If desired, the standard 19$^a$ of the arm rest 10$^a$ may be provided with an extension 19$^b$ which is disposed transversely of the seat cushion.

The arms 23 provides a convenient attaching means for the bars 15$^a$. In addition, this form of the invention is especially useful in demonstrating the rest to possible purchasers, in that the weight of the cushion and the person seated thereon will act to hold the arms 23 temporarily in place. Considerable time is thus saved in positioning and removing the bars 15$^a$.

In the form of the invention shown in Figure 8, the spaced bars 15 are attached to spaced arms 25 which form part of a bracket 26 secured to the back of the seat frame 12.

It will be seen from the foregoing description and accompanying drawings that the invention provides an exceedingly useful article which will greatly add to the comfort of the occupants or occupant of the seat, in that it will provide a support and a person upon the seat will be able to resist objectionable seat rocking motion when the automobile is making a turn.

The invention is susceptible of various changes in its form, proportions and minor details of construction and the right is herein reserved to make such changes as properly fall within the scope of the appended claim.

Having described the invention what is claimed is:—

In combination, a seat, an arm rest adapted to be disposed transversely of the seat, vertically-spaced horizontal bars extending longitudinally at the rear of the seat and provided with spaced vertically-alined openings of angular form, and a standard carried by the rest and having a lower portion of angular cross-section for removable arrangement in lower and upper alined openings of the bars and also having on said lower portion a shoulder to bear on the upper bar.

In testimony whereof I affix my signature.

JOHN T. SCULLY.